(12) United States Patent
Kim

(10) Patent No.: US 10,419,670 B2
(45) Date of Patent: Sep. 17, 2019

(54) OMNIDIRECTIONAL IMAGE CAPTURING METHOD AND APPARATUS PERFORMING THE METHOD

(71) Applicant: LINKFLOW CO. LTD, Seoul (KR)

(72) Inventor: Yong Kuk Kim, Gyeonggi-do (KR)

(73) Assignee: LINKFLOW CO. LTD, Seoul (KR)

( * ) Notice: Subject to any disclaimer, the term of this patent is extended or adjusted under 35 U.S.C. 154(b) by 0 days.

(21) Appl. No.: 16/040,732

(22) Filed: Jul. 20, 2018

(65) Prior Publication Data

US 2018/0332220 A1 Nov. 15, 2018

Related U.S. Application Data

(63) Continuation of application No. PCT/KR2017/006419, filed on Jun. 19, 2017.

(30) Foreign Application Priority Data

Mar. 7, 2017 (KR) ........................ 10-2017-0028745

(51) Int. Cl.
*H04N 5/00* (2011.01)
*H04N 5/232* (2006.01)
(Continued)

(52) U.S. Cl.
CPC ....... *H04N 5/23238* (2013.01); *G06T 3/4038* (2013.01); *H04N 5/247* (2013.01); *G06F 3/013* (2013.01)

(58) Field of Classification Search
CPC ...... H04N 5/225; H04N 5/232; H04N 5/2251; H04N 5/23238; G03B 37/04
See application file for complete search history.

(56) References Cited

U.S. PATENT DOCUMENTS

| | | | |
|---|---|---|---|
| 5,023,725 A | 6/1991 | McCutchen | |
| 2003/0133008 A1* | 7/2003 | Stephenson | .......... H04N 5/2251 348/47 |

(Continued)

FOREIGN PATENT DOCUMENTS

| | | |
|---|---|---|
| JP | 2007-043225 A | 5/2007 |
| KR | 10-2014-0033009 A | 3/2014 |

(Continued)

OTHER PUBLICATIONS

Extended European Search Report issued in related European Patent Application No. 17890844.8 dated Nov. 12, 2018.

(Continued)

*Primary Examiner* — Frank F Huang
(74) *Attorney, Agent, or Firm* — K&L Gates LLP

(57) ABSTRACT

An omnidirectional image capturing method and an apparatus performing the method are provided. An omnidirectional image processing apparatus includes: a plurality of image capturing units configured to generate a plurality of images for generating an omnidirectional image; and a processor configured to process the plurality of images, wherein the plurality of images are generated based on a plurality of image capturing lines of the plurality of image capturing units and the plurality of image capturing lines are imaginary lines vertically penetrating centers of a plurality of lenses included in the plurality of image capturing units, respectively.

7 Claims, 10 Drawing Sheets

(51) Int. Cl.
    *G06T 3/40*     (2006.01)
    *H04N 5/247*     (2006.01)
    *G06F 3/01*     (2006.01)

(56) References Cited

U.S. PATENT DOCUMENTS

| | | | |
|---|---|---|---|
| 2012/0105574 A1* | 5/2012 | Baker | G03B 35/08 348/36 |
| 2016/0284048 A1 | 9/2016 | Rekimoto et al. | |
| 2017/0018217 A1 | 1/2017 | Ogino et al. | |

FOREIGN PATENT DOCUMENTS

| | | |
|---|---|---|
| KR | 10-2015-0049168 A | 5/2015 |
| KR | 10-2016-0122702 A | 10/2016 |
| KR | 10-2017-0021453 A | 2/2017 |

OTHER PUBLICATIONS

Search Report issued in related International Application No. PCT/KR2017/006419 dated Dec. 4, 2017.

\* cited by examiner

OMNIDIRECTIONAL IMAGE CAPTURING METHOD AND APPARATUS PERFORMING THE METHOD

CROSS REFERENCE TO RELATED APPLICATIONS

The present application is a continuation of International Application No. PCT/KR2017/006419, filed Jun. 19, 2017, which claims priority to Korean Patent Application No. 10-2017-0028745, filed on Mar. 7, 2017, the entire contents of each which are incorporated herein by reference.

FIELD OF THE INVENTION

The present inventive concept relates to an omnidirectional image capturing method and an apparatus performing the omnidirectional image capturing method, and more particularly, an omnidirectional image capturing method capable of capturing an omnidirectional image (or a 360-degree image) using a plurality of image capturing units provided in a wearable device and an apparatus performing the omnidirectional image capturing method.

BACKGROUND

An omnidirectional imaging system is an imaging system capable of recording image information of all directions (360 degrees) from a particular point. Since the omnidirectional imaging system can provide very wide field-of-view images, as compared to an existing imaging system, the range of applications of the omnidirectional imaging system has increasingly been broadened not only to research fields such as the fields of computer vision and mobile robots, but also to practical fields such as the fields of surveillance systems, virtual reality systems, and pan-tilt-zoom (PTZ) cameras, and video conferencing.

Various methods can be used to obtain an omnidirectional image. For example, images may be obtained by rotating one camera with respect to an optical axis that satisfies a single view point, and an omnidirectional image may be generated by combining the images. In another example, a method may be used in which a plurality of cameras are arranged into an annular structure and images obtained by the plurality of cameras are combined. A user may generate an omnidirectional image using various omnidirectional image processing apparatuses (or omnidirectional image processing cameras) for obtaining an omnidirectional image.

However, an existing omnidirectional image processing apparatus is inconvenient to carry around and thus has a problem in that the user may not be able to obtain omnidirectional images naturally in his or her daily life. For example, the existing omnidirectional image processing apparatus is installed (or mounted) at a certain place, or held by both hands of the user, to stably acquire an omnidirectional image. Also, when image capturing is performed in a handheld mode, an image of the user may also be captured due to the characteristics of a 360-degree camera, so that the image of the user may be included in an omnidirectional image.

Thus, it is difficult for the user to acquire an omnidirectional image easily and naturally using the existing omnidirectional image processing apparatus.

SUMMARY

Exemplary embodiments of the present inventive concept aim at addressing all the aforementioned problems.

Also, exemplary embodiments of the present inventive concept aim at making an omnidirectional image processing apparatus easy to carry around and allowing a user to capture an omnidirectional image with both hands free.

Also, exemplary embodiments of the present inventive concept aim at generating a natural omnidirectional image by stitching together a plurality of images captured by a plurality of cameras at different locations.

Aspects of the present inventive concept are as follows.

According to an aspect of the present inventive concept, an omnidirectional image processing apparatus includes: a plurality of image capturing units configured to generate a plurality of images for generating an omnidirectional image; and a processor configured to process the plurality of images, wherein the plurality of images are generated based on a plurality of image capturing lines of the plurality of image capturing units and the plurality of image capturing lines are imaginary lines vertically penetrating centers of a plurality of lenses included in the plurality of image capturing units, respectively.

According to another aspect of the present inventive concept, an omnidirectional image processing method includes: generating, by a plurality of image capturing units, a plurality of images for generating an omnidirectional image; and generating an omnidirectional image by processing the plurality of images, wherein the plurality of images are generated based on a plurality of image capturing lines of the plurality of image capturing units and the plurality of image capturing lines are imaginary lines vertically penetrating centers of a plurality of lenses included in the plurality of image capturing units, respectively.

According to exemplary embodiments of the present inventive concept, a user can carry around an omnidirectional image processing apparatus with ease and can capture an omnidirectional image with both hands free.

In addition, a natural omnidirectional image can be generated by stitching together, or correcting, a plurality of images captured by a plurality of cameras at different locations in the omnidirectional image processing apparatus.

DETAILED DESCRIPTION

Figure 1:
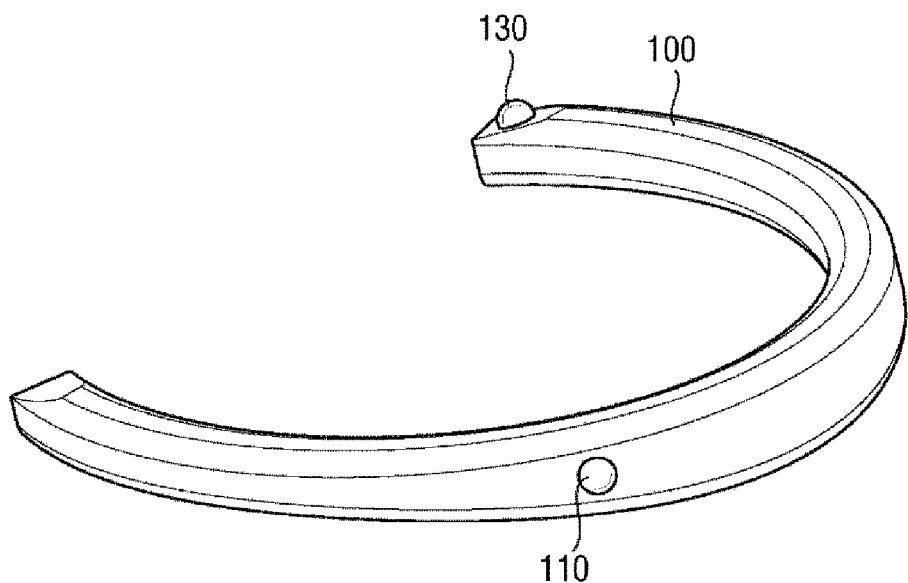
FIG. 1 is a schematic view illustrating an omnidirectional image processing apparatus according to an exemplary embodiment of the present inventive concept.
Figure 1:
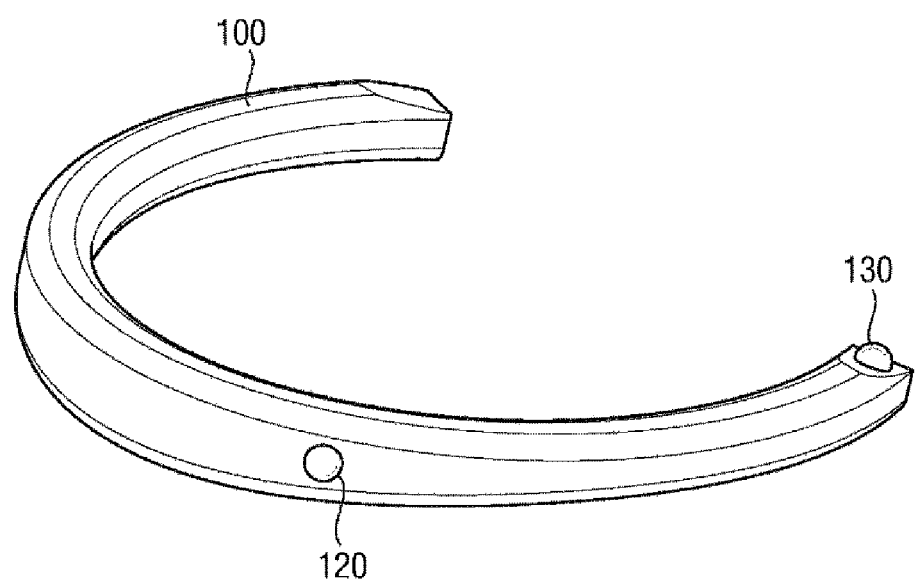

In the following detailed description of the present inventive concept, references are made to the accompanying drawings that show, by way of illustration, specific embodiments in which the present inventive concept may be practiced. These embodiments are described in sufficient detail to enable those skilled in the art to practice the present inventive concept. It is to be understood that the various embodiments of the present inventive concept, although different from each other, are not necessarily mutually exclusive. For example, specific shapes, structures and characteristics described herein may be implemented as modified from one embodiment to another without departing from the spirit and scope of the present inventive concept. Furthermore, it shall be understood that the locations or arrangements of individual components within each embodiment may also be modified without departing from the spirit and scope of the present inventive concept. Therefore, the following detailed description is not to be taken in a limiting sense, and the scope of the present inventive concept is to be taken as encompassing the scope of the appended claims and all equivalents thereof. In the drawings, like reference numerals refer to the same or similar elements throughout the several views.

Hereinafter, preferred embodiments of the present inventive concept will be described in detail with reference to the accompanying drawings to enable those skilled in the art to easily implement the present inventive concept.

Meanwhile, it should be understood that the term "omnidirectional image processing apparatus" herein encompasses a camera capable of capturing an omnidirectional image (or a 360-degree image).

FIG. 1 is a schematic view illustrating an omnidirectional image processing apparatus according to an exemplary embodiment of the present inventive concept.

The structure of the omnidirectional image processing apparatus according to an exemplary embodiment of the present inventive concept is as illustrated in FIG. 1.

Referring to FIG. 1, an omnidirectional image processing apparatus 100 may have a wearable structure and may have a necklace-like shape that can be worn around the neck of a user. The omnidirectional image processing apparatus 100 may be in the shape of an open necklace that is open on one side thereof, as illustrated in FIG. 1, or in the shape of a non-open necklace. In the description that follows, it is assumed that the omnidirectional image processing apparatus 100 has a U shape that is open on one side thereof. The omnidirectional image processing apparatus 100, which is U-shaped, may be worn around the neck of the user as a wearable device and may be able to capture an omnidirectional image.

For convenience, it is assumed that the omnidirectional image processing apparatus 100 is worn around the neck of the user in the shape of a necklace (or in the shape of an open necklace that is open on one side thereof or in a U shape). However, the omnidirectional image processing apparatus 100 may not necessarily be worn around the neck of the user. For example, the omnidirectional image processing apparatus 100 may acquire an omnidirectional image by being hung on/attached to other parts of the body of the user or an external object.

The user can wear the omnidirectional image processing apparatus 100 around his or her neck and can thus acquire a plurality of images for generating an omnidirectional image with both hands free.

The omnidirectional image processing apparatus 100 may include a plurality of image capturing units. The plurality of image capturing units may be provided at the omnidirectional image processing apparatus 100 to be a particular distance (or a predetermined distance) apart from one another and may independently capture images in accordance with a predetermined field of view/image capturing line. The locations of the plurality of image capturing units may be fixed in the omnidirectional image processing apparatus 100, but may be movable so that their locations may vary.

For example, the omnidirectional image processing apparatus 100 may include three image capturing units, and the three image capturing units may capture an omnidirectional image with a predetermined field of view (e.g., 120 degrees to 180 degrees). The three image capturing units may be first, second, and third image capturing units 110, 120, and 130.

For convenience, an omnidirectional image processing apparatus 100 including three image capturing units will hereinafter be described. However, the omnidirectional image processing apparatus 100 may be modified to include less than three, or more than three, image capturing units (e.g., two, four, five, or six image capturing units) to capture an omnidirectional image, without departing from the spirit and scope of the present inventive concept.

The first, second, and third image capturing units 110, 120, and 130 may capture an image in accordance with a predetermined field of view. At given time resources, a first image may be generated by the first image capturing unit 110, a second image may be generated by the second image capturing unit 120, and a third image may be generated by the third image capturing unit 130. The first, second, and third image capturing units 110, 120, and 130 may have a field of view of 120 degrees or greater, and there may exist overlapping imaging areas between the first, second, and third images. Thereafter, an omnidirectional image may be generated by stitching together and/or correcting the first, second, and third images, which are captured at the given time resources by the omnidirectional image processing apparatus 100. The stitching and/or the correcting of a plurality of images may be performed by the omnidirectional image processing apparatus or may be performed by a user device (such as a smartphone) that can communicate with the omnidirectional image processing apparatus 100. That is, additional image processing for a plurality of images generated may be performed by the omnidirectional image processing apparatus 100 and/or another image processing apparatus (such as a smartphone, a personal computer (PC), or the like).

The characteristics of the omnidirectional image processing apparatus and an omnidirectional image generation method will hereinafter be described.

Figure 2:
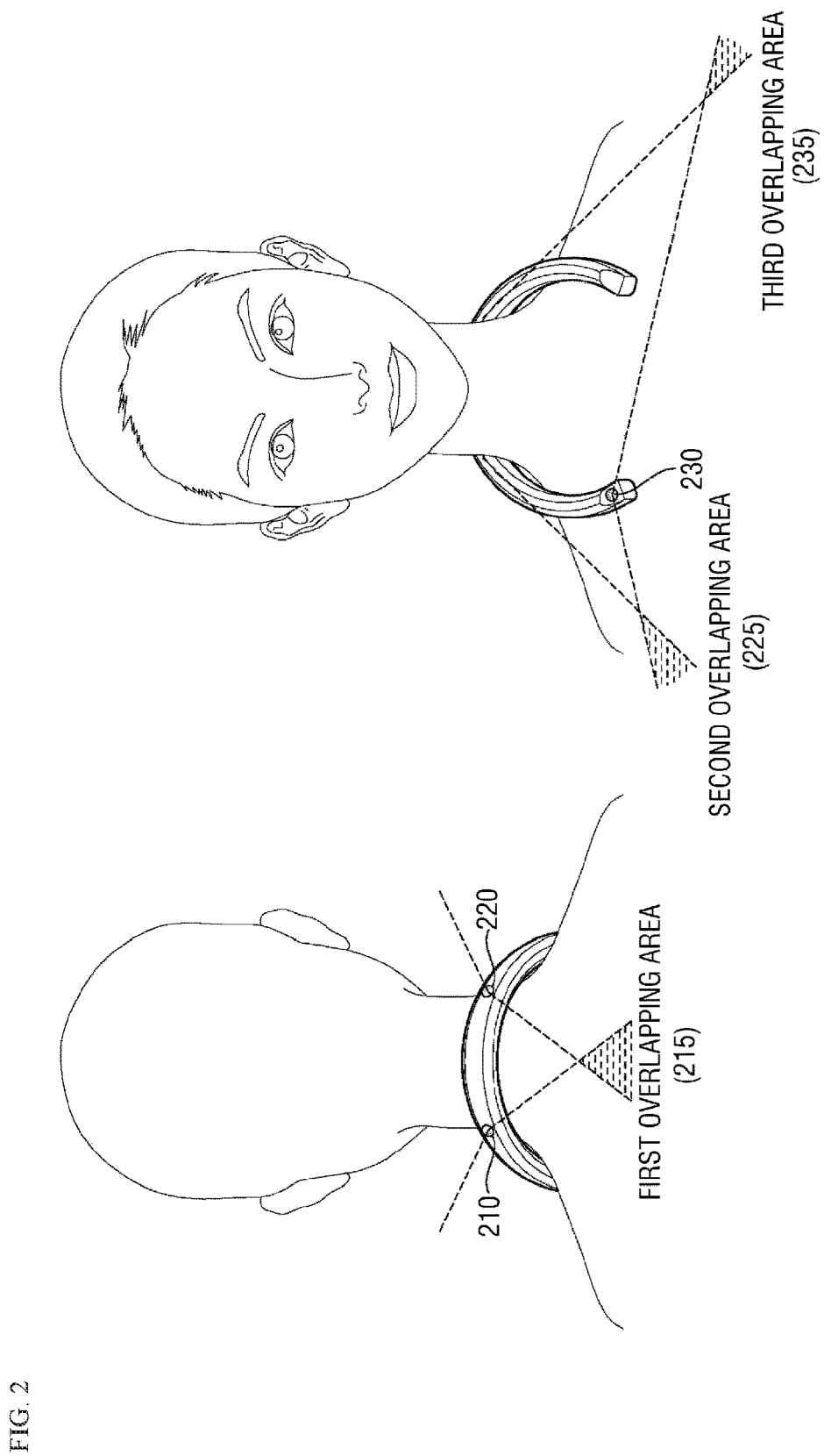
FIG. 2 is a schematic view showing the characteristics of a plurality of image capturing units provided in an omnidirectional image processing apparatus according to an exemplary embodiment of the present inventive concept.

FIG. 2 is a schematic view showing the characteristics of a plurality of image capturing units provided in the omnidirectional image processing apparatus according to an exemplary embodiment of the present inventive concept.

FIG. 2 shows the characteristics of a plurality of image capturing units provided in a U-shaped omnidirectional image processing apparatus. The locations of the plurality of image capturing units illustrated in FIG. 2 are merely exemplary. The plurality of image capturing units may be disposed at various locations in the omnidirectional image processing apparatus to capture a plurality of images for generating an omnidirectional image.

The rear of the omnidirectional image processing apparatus is as illustrated in the upper part of FIG. 2.

First and second image capturing units 210 and 220, which are included in the omnidirectional image processing apparatus, may be located at a curved part of the omnidirectional image processing apparatus where curvature exists. Specifically, in a case where the omnidirectional image processing apparatus is a wearable device that can be worn around the neck of a user, the first and second image capturing units 210 and 220 may be provided at the curved part of the omnidirectional image processing apparatus that is in contact with the back of the neck of the user. For example, the first and second image capturing units 210 and 220 may be a predetermined distance apart from a point on the U-shaped omnidirectional image processing apparatus with a maximum curvature (e.g., the middle part of the U-shaped omnidirectional image processing apparatus).

The first image capturing unit 210 may capture an image of a region including a rear left blind spot with respect to the user's line of sight. The second image capturing unit 220 may capture an image of a region including a rear right blind spot with respect to the user's line of sight. Specifically, the first image capturing unit 210 may have a first field of view and may capture an image of a region corresponding to the first field of view. The second image capturing unit 220 may have a second field of view and may capture an image of a region corresponding to the second field of view. For example, the first and second fields of view may be 120 degrees to 180 degrees.

When image capturing is performed by the first and second image capturing units 210 and 220, a first overlapping area 215, which is the overlapping area of the first and second fields of view, may be generated. Thereafter, an omnidirectional image may be generated through image stitching in consideration of the overlapping area.

The front of the omnidirectional image processing apparatus is as illustrated in the lower part of FIG. 2.

A third image capturing unit 230 may be disposed at the front of the omnidirectional image processing apparatus. Specifically, the third image capturing unit 230 may be disposed at an end portion of the omnidirectional image processing apparatus (i.e., at an end portion of the U-shaped omnidirectional image processing apparatus). In a case where the omnidirectional image processing apparatus is a wearable device that can be worn around the neck of a user, the end portion of the U-shaped omnidirectional image processing apparatus may be located to be face forward (i.e., toward the direction of the user's gaze). The omnidirectional image processing apparatus includes first and second end portions, and the third image capturing unit 230 may be disposed at one of the first and second end portions.

The third image capturing unit 230 may perform image capturing in the same direction as the direction of the user's gaze to capture an image of a region corresponding to the user's gaze.

Specifically, the third image capturing unit 230 may have a third field of view and may capture an image of a region corresponding to the third field of view. For example, the third field of view may be 120 degrees to 180 degrees. In a case where image capturing is performed by the third image capturing unit 230, a second overlapping area 225, which is the overlapping area of the first field of view of the first image capturing unit 210 and the third field of view of the third image capturing unit 230, may be generated. Also, in the case where image capturing is performed by the third image capturing unit 230, a third overlapping area 235, which is the overlapping area of the second field of view of the second image capturing unit 220 and the third field of view of the third image capturing unit 230, may be generated.

Due to the structural characteristics of the omnidirectional image processing apparatus as a wearable device that can be worn around the neck of the user, the first and second image capturing units 210 and 220 may be positioned relatively higher than the third image capturing unit 230. Also, the third image capturing unit 230 may be disposed at only one end portion of the omnidirectional image processing apparatus.

In an existing omnidirectional image processing apparatus, a plurality of image capturing units may be configured to be disposed at the same height and to have a predetermined angle, but in the omnidirectional image processing apparatus according to an exemplary embodiment of the present inventive concept, a plurality of image capturing units may be configured to have different angles and to be disposed at different heights. Thus, the first, second, and third overlapping areas 215, 225, and 235, which are generated by a plurality of images captured by the plurality of image capturing units of the omnidirectional image processing apparatus according to an exemplary embodiment of the present inventive concept, may have different sizes and/or different shapes.

Thereafter, an omnidirectional image may be generated by performing image processing (such as image stitching/correction) on the first, second, and third images captured by the first, second, and third image capturing units 210, 220, and 230, respectively, in consideration of the first, second, and third overlapping areas 215, 225, and 235.

The first, second, and third fields of view may be set to be the same, or to differ from one another, without departing from the spirit and scope of the present inventive concept.

Figure 3:
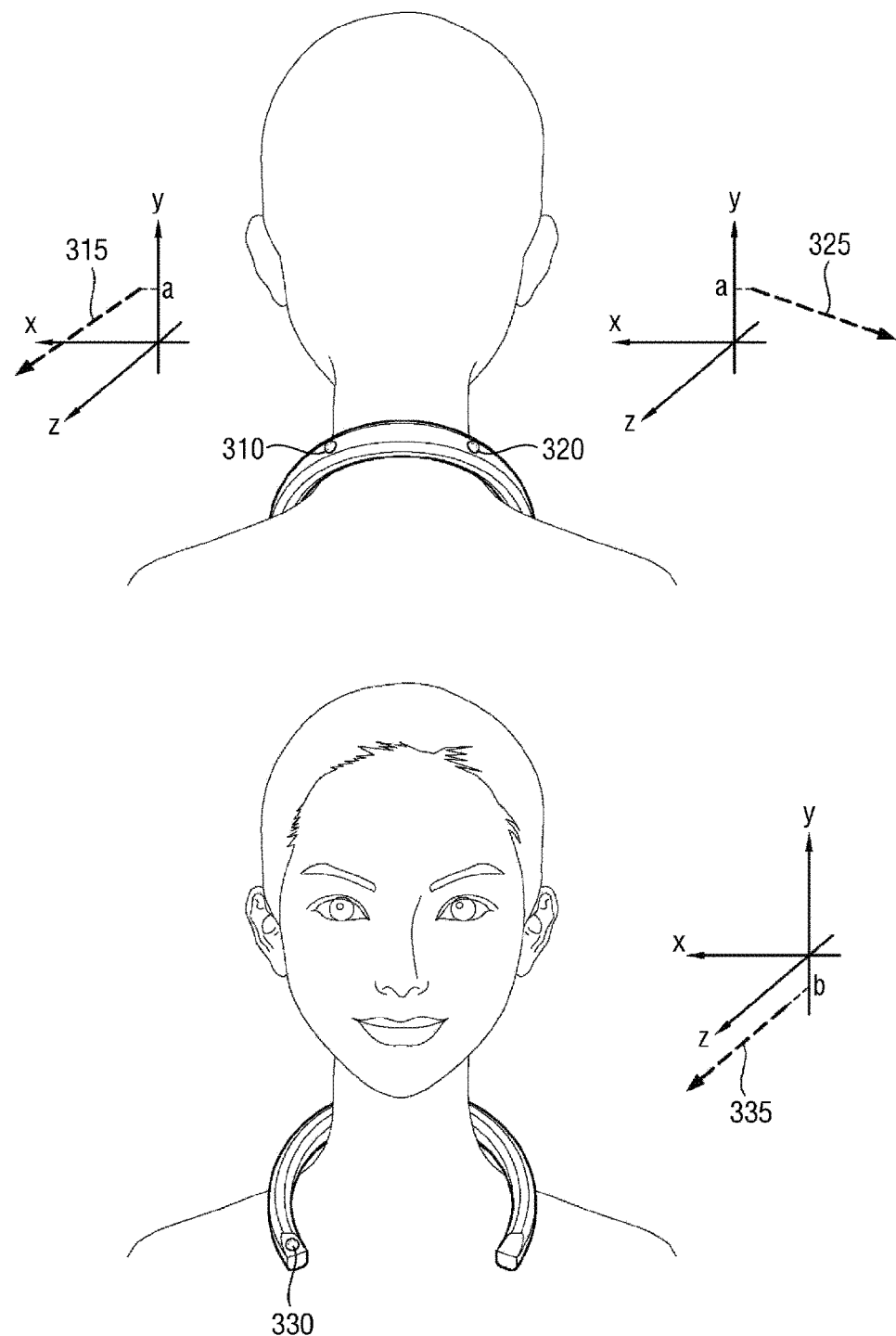
FIG. 3 is a schematic view illustrating image capturing lines of a plurality of image capturing units according to an exemplary embodiment of the present inventive concept.

FIG. 3 is a schematic view illustrating image capturing lines of a plurality of image capturing units according to an exemplary embodiment of the present inventive concept.

FIG. 3 illustrates image capturing lines of a plurality of image capturing units installed in an omnidirectional image processing apparatus according to an exemplary embodiment of the present inventive concept. Assuming that the ground is parallel to the X-Z plane formed by the X axis and the Y axis, the plurality of image capturing lines may be defined as lines vertically penetrating the centers of the lenses of the plurality of image capturing units included in the omnidirectional image processing apparatus according to an exemplary embodiment of the present inventive concept in a space defined by the X axis, the Y axis, and the Z axis.

In an existing omnidirectional image processing apparatus, a plurality of image capturing units may be implemented at the same height at a predetermined angle (of, for example, 120 degrees). In this case, a plurality of image capturing lines of the plurality of image capturing units included in the existing omnidirectional image processing apparatus may be a plurality of lines extending in parallel to the ground (or the X-Z plane) and having a predetermined angle (of, for example, 120 degrees) with respect to one another.

As already described above, in the omnidirectional image processing apparatus according to an exemplary embodiment of the present inventive concept, the plurality of image capturing units may have different heights (or locations) and different angles with respect to one another (or the image capturing lines of the plurality of image capturing units have different angles with respect to one another) during image capturing. Thus, the properties of the image capturing lines of the omnidirectional image processing apparatus according to an exemplary embodiment of the present inventive concept differ from the properties of the image capturing lines of the existing omnidirectional image processing apparatus.

The image capturing lines of the plurality of image capturing units, illustrated in FIG. 3, are exemplary for showing differences in properties (for example, in height and angle) between the image capturing lines of the plurality of image capturing units, resulting from the characteristics of a wearable device. Also, the image capturing lines of FIG. 3 may be image capturing lines when a user who wears the omnidirectional image processing apparatus according to an exemplary embodiment of the present inventive concept does not move or the omnidirectional image processing apparatus according to an exemplary embodiment of the present inventive concept is fixed in a particular state.

The upper part of FIG. 3 illustrates image capturing lines of first and second image capturing units 310 and 320.

The first and second image capturing units 310 and 320 may be positioned relatively higher than a third image capturing unit 330. Assuming that a user who wears an omnidirectional image capturing apparatus around is standing in a Y-axis direction, due to the structural characteristics of a wearable device that can be worn the neck, a part of the omnidirectional image capturing apparatus with curvature (i.e., a curved/central part of a U shape) where the first and second image capturing units 310 and 320 are disposed may be relatively lifted up, and a leg part of the omnidirectional image capturing apparatus (i.e., an end part of the U shape) where the third image capturing unit 330 is disposed may be relatively lifted down.

For example, a first image capturing line 315 of the first image capturing line 310 may be parallel to the X-Z plane and may have angle 1, angle 2, and angle 3 with respect to the X axis, the Y axis, and the Z axis, respectively, at a point "a" on the Y axis.

A second image capturing line 325 of the second image capturing unit 320 may be parallel to the X-Z plane and may have angle 4, angle 5, and angle 6 with respect to the X axis, the Y axis, and the Z axis, respectively, at the point "a" on the Y axis.

Referring to the lower part of FIG. 3, a third image capturing line 335 of the third image capturing unit 330 may be parallel to the X-Z plane and may have angle 7, angle 8, and angle 9 with respect to the X axis, the Y axis, and the Z axis, respectively, at a point "b" on the Y axis. Here, b may be a smaller value than a. The third image capturing line 335 of the third image capturing unit 330 may be parallel to the X-Z plane and may face forward like the user's gaze (for example, toward a direction perpendicular to the X-Y plane).

That is, the first and second image capturing lines 315 and 325 may have the same height with respect to the Y axis, and the third image capturing line 335 may be positioned relatively lower than the first and second image capturing lines with respect to the Y axis. The first, second, and third image capturing lines 315, 325, and 335 illustrated in FIG. 3 are exemplary image capturing lines having different properties, and various image capturing lines other than those set forth herein can be defined to capture an omnidirectional image.

Figure 4:
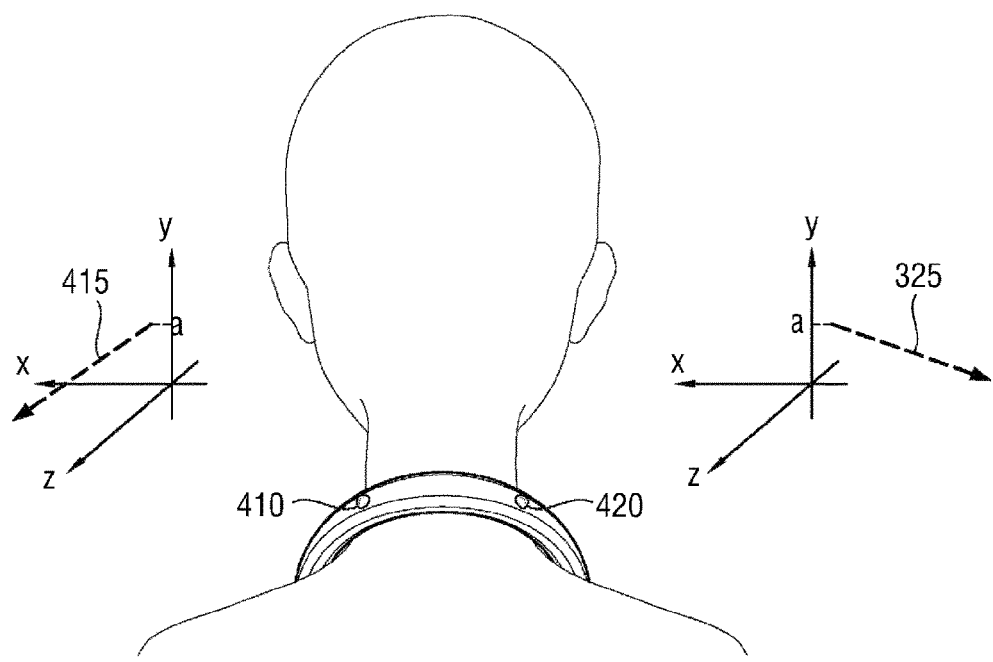
FIG. 4 is a schematic view illustrating image capturing lines of a plurality of image capturing units according to an exemplary embodiment of the present inventive concept.
Figure 4:
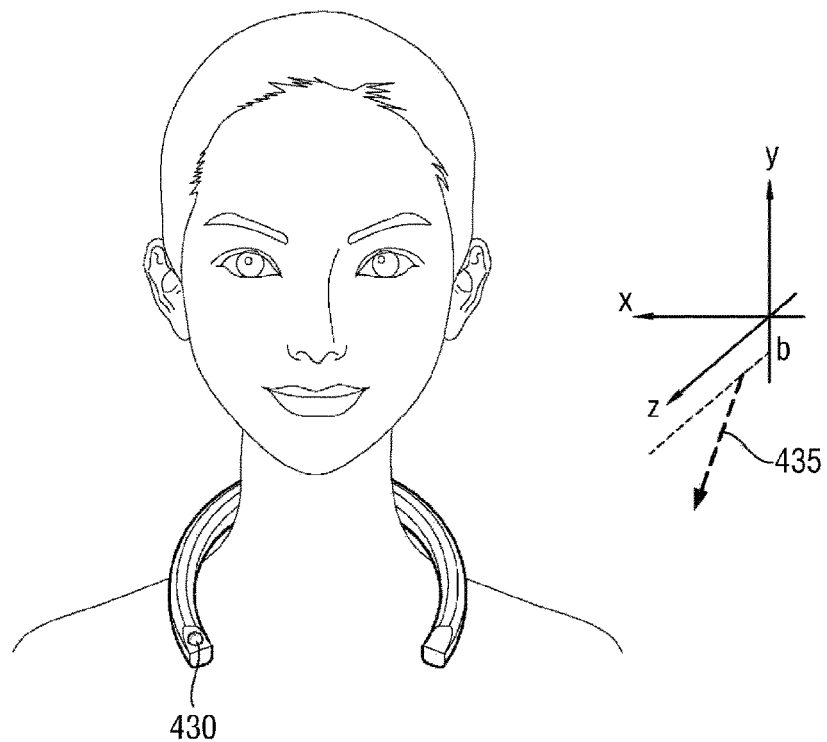

FIG. 4 is a schematic view illustrating image capturing lines of a plurality of image capturing units according to an exemplary embodiment of the present inventive concept.

FIG. 4 illustrates image capturing lines of a plurality of image capturing units, which are different from those of FIG. 3. It is assumed that the ground is parallel to the X-Z plane formed by the X axis and the Y axis.

The upper part of FIG. 4 illustrates image capturing lines of first and second image capturing units 410 and 420.

The first and second image capturing units 410 and 420 may be positioned relatively higher than a third image capturing unit 430. Assuming that a user is standing in a Y-axis direction, due to the structural characteristics of a wearable device that can be worn around the neck, image capturing may be performed in a state in which a part of the omnidirectional image capturing apparatus with curvature (i.e., a curved part of a U shape) where the first and second image capturing units 410 and 420 are disposed is relatively lifted up and a leg part of the omnidirectional image capturing apparatus (i.e., an end part of the U shape) where the third image capturing unit 430 is disposed is relatively lifted down.

For example, a first image capturing line 415 of the first image capturing line 410 may be parallel to the X-Z plane and may have angle 1, angle 2, and angle 3 with respect to the X axis, the Y axis, and the Z axis, respectively, at a point "a" on the Y axis.

A second image capturing line 415 of the second image capturing unit 420 may be parallel to the X-Z plane and may have angle 4, angle 5, and angle 6 with respect to the X axis, the Y axis, and the Z axis at the point "a" on the Y axis.

The lower part of FIG. 4 illustrates an image capturing line of the third image capturing unit 430.

A third image capturing line 435 of the third image capturing unit 430 may be parallel to the X-Z plane and may have angle 7, angle 8, and angle 9 with respect to the X axis, the Y axis, and the Z axis, respectively, at a point "b" on the Y axis.

Since the third image capturing unit 430 is disposed at an end portion of the omnidirectional image processing apparatus, the third image capturing line may not be parallel to the X-Z plane or may have a predetermined angle (of, for example, 0 to 30 degrees) with respect to the X-Z plane.

That is, the first and second image capturing lines 415 and 425 may have the same height with respect to the Y axis, and the third image capturing line 435 may be positioned relatively lower than the first and second image capturing lines 415 and 425 with respect to the Y axis. Also, the first and second image capturing lines 415 and 425 may be parallel to the X-Z plane, but the third image capturing line 435 may not be parallel to the X-Z plane.

In another exemplary embodiment of the present inventive concept, the first image capturing line of the first image capturing unit may form angle 1' with respect to the X-Z plane and may have angle 1, angle 2, and angle 3 with respect to the X axis, the Y axis, and the Z axis, respectively, starting from the point "a" on the Y axis, the second image capturing line of the second image capturing unit may form angle 1' with respect to the X-Z plane and may have angle 4, angle 5, and angle 6 with respect to the X axis, the Y axis, and the Z axis, respectively, starting from the point "a" on the Y axis, and the third image capturing line of the third image capturing unit may form angle 2' with respect to the X-Z plane and may have angle 7, angle 8, and angle 9 with respect to the X axis, the Y axis, and the Z axis, respectively, starting from a point "b" on the Y axis.

In yet another exemplary embodiment of the present inventive concept, the first image capturing line of the first image capturing unit may form angle 1' with respect to the X-Z plane and may have angle 1, angle 2, and angle 3 with respect to the X axis, the Y axis, and the Z axis, respectively, starting from the point "a" on the Y axis, the second image capturing line of the second image capturing unit may form angle 2' with respect to the X-Z plane and may have angle 4, angle 5, and angle 6 with respect to the X axis, the Y axis, and the Z axis, respectively, starting from the point "a" on the Y axis, and the third image capturing line of the third image capturing unit may form angle 3' with respect to the X-Z plane and may have angle 7, angle 8, and angle 9 with respect to the X axis, the Y axis, and the Z axis, respectively, starting from the point "b" on the Y axis.

That is, in the omnidirectional image processing apparatus according to an exemplary embodiment of the present inventive concept, unlike in an image processing apparatus where the image capturing lines of a plurality of image capturing units have the same angle with respect to the ground at a given point on the Y axis, the image capturing lines of a plurality of image capturing units may be positioned at different points on the Y axis and may have different angles with respect to the ground (or the X-Z plane).

Figure 5:
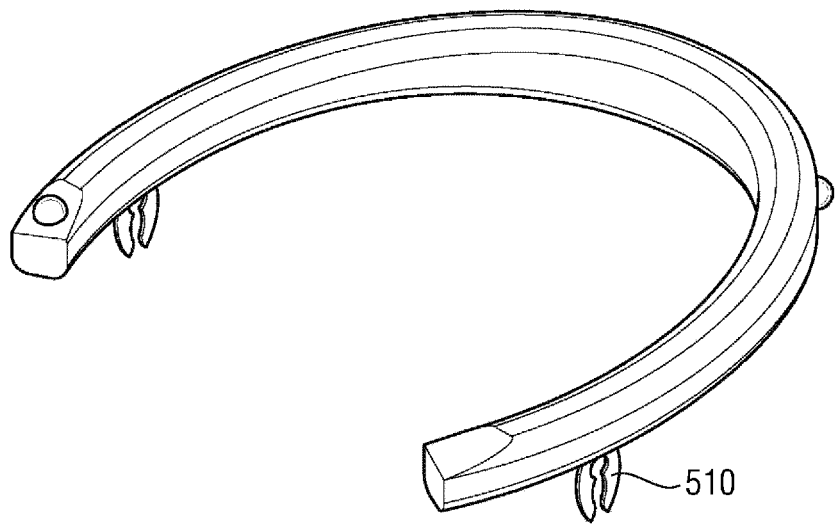
FIG. 5 is a schematic view illustrating a method of fixing an omnidirectional image processing apparatus according to an exemplary embodiment of the present inventive concept.
Figure 5:
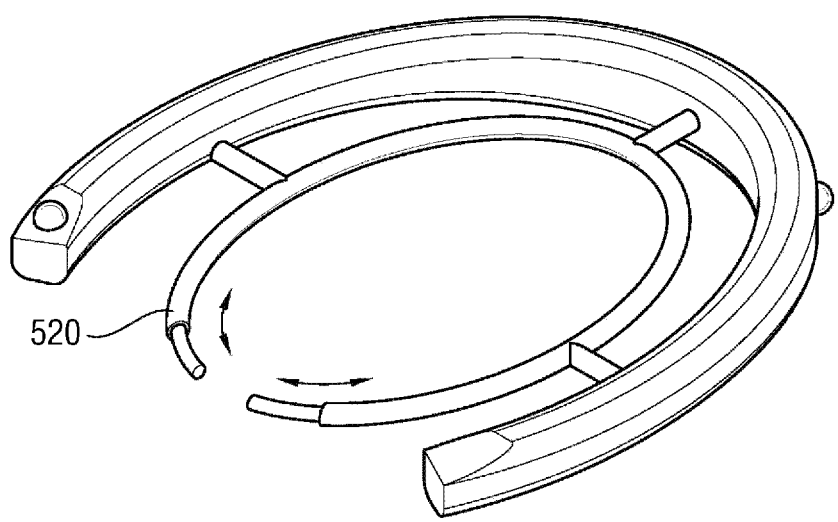

FIG. 5 is a schematic view illustrating a method of fixing an omnidirectional image processing apparatus according to an exemplary embodiment of the present inventive concept.

FIG. 5 illustrates a fixing structure for reducing shake in an omnidirectional image processing apparatus (or shake in an image captured by the omnidirectional image processing apparatus) when a user who wears the omnidirectional image processing apparatus is moving.

Referring to the upper part of FIG. 5, in an omnidirectional image processing apparatus, a fixing structure 510 for fixing a user and the omnidirectional image processing apparatus together may be additionally provided.

For example, a structure for holding and fixing a particular object onto the omnidirectional image processing apparatus, such as pairs of tongs 510, may be implemented. The user may couple his or her clothes and the omnidirectional image processing apparatus using the pairs of tongs 510 and may thus prevent the omnidirectional image processing apparatus from being moved excessively.

Also, referring to the lower part of FIG. 5, an inner fixing structure 520 that can be attached to, and worn around, the neck of a user may be implemented, and the inner fixing structure 520 may be coupled to an omnidirectional image processing apparatus via connectors. The inner fixing structure 520 may be open on one side thereof so as to be convenient to be worn on the neck of the user.

Figure 6:
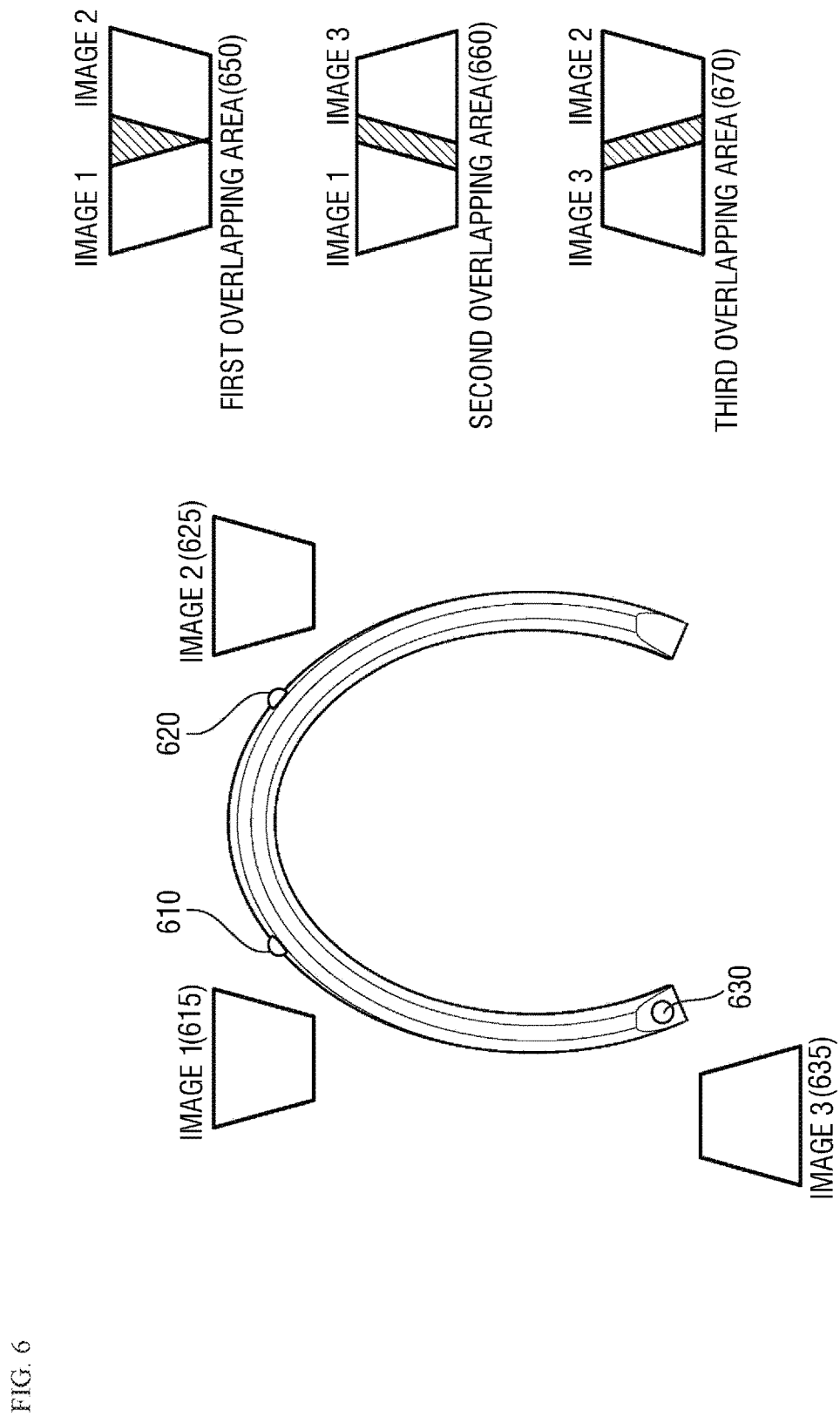
FIG. 6 is a schematic view illustrating an image processing method of an omnidirectional image processing apparatus according to an exemplary embodiment of the present inventive concept.

FIG. 6 is a schematic view illustrating an image processing method of an omnidirectional image processing apparatus according to an exemplary embodiment of the present inventive concept.

FIG. 6 shows a method of generating an omnidirectional image by stitching together images captured by a plurality of image capturing units.

Referring to FIG. 6, as already described above, image capturing lines of the plurality of image capturing units may not necessarily have the same properties (such as height and angle with respect to the ground). Due to differences in the properties of the image capturing lines of the plurality of image capturing units, images captured by the plurality of image capturing units may also have different properties from one another.

The angle that an image capturing line of each of first, second, and third image capturing units 610, 620, and 630 forms with the X-Z plane (or the ground) may vary depending on a user's action (such as bending backward or forward). For example, the image capturing lines of the first and second image capturing units 610 and 620 may face upward to have a positive angle with respect to the X-Z plane (or the ground), and the image capturing line of the third image capturing unit 630 may face downward to have a negative angle with respect to the X-Z plane (or the ground).

In this case, image 1 (615) captured by the first image capturing unit 610 and image 2 (625) captured by the second image capturing unit 620 may have an inversely trapezoidal shape that becomes wider in a positive Y-axis direction. On the other hand, image 3 (635) captured by the third image capturing unit 630 may have a trapezoidal shape that becomes wider in a negative Y-axis direction.

Image 1 (615) and image 2 (625), which are inversely trapezoidal in shape, and image 3 (635), which is trapezoidal in shape, may be stitched together by the omnidirectional image processing apparatus, and as a result, an omnidirectional image may be generated. As already described above, a first overlapping area 650 of image 1 (615) and image 2 (625), a second overlapping area 660 of image 1 (615) and image 3 (635), and a third overlapping area 630 of image 2 (625) and image 3 (635) may have different shapes. That is, unlike in the case of an existing omnidirectional image processing apparatus, the images captured by the plurality of image capturing units may have different shapes, and when the shapes of the captured images are different from one another, the overlapping areas of the captured images may have different properties. In one exemplary embodiment of the present inventive concept, an omnidirectional image may be generated by stitching together the first, second, and third overlapping areas 660, 670, and 680, which have different shapes.

For example, a feature point in each overlapping area may be used to stitch together a plurality of images captured by the omnidirectional image processing apparatus. For example, in order to stitch the first and second images together, a first feature point may be extracted from an object in the first overlapping area 660 included in image 1 (615), and a second feature point may be extracted from the same object in the first overlapping area 660 included in the second image. Thereafter, the first and second feature points may be matched to stitch Image 1 (615) and image 2 (625) together.

For example, in the omnidirectional image processing apparatus according to an exemplary embodiment of the present inventive concept, scale invariant feature transform (SIFT)-based feature point extraction and image stitching may be performed. In SIFT, feature points are detected by locating the centers of regions that are darker or brighter than their surroundings through Difference-of-Gaussian (DoG), and descriptors may be generated using the surrounding pixels of each of the feature points and using main-direction components and 128- or 64-dimensional vectors. Thereafter, matching may be performed on the feature points based on the descriptors of the feature points, and image stitching may be performed. SIFT-based feature point extraction is merely an example of a method for feature point extraction and image stitching, and other various methods may be used to perform feature point extraction and image stitching.

According to an exemplary embodiment of the present inventive concept, feature points may be extracted only for some objects for faster image processing. For example, the omnidirectional image processing apparatus may extract feature points first for an object whose feature points can be easily extracted from each overlapping area, rather than for a background part (such as a mountain, the sky, or the like) whose feature points cannot be easily extracted from each overlapping area, and may then perform matching for feature points.

Also, in a case where feature points cannot be found from a particular overlapping area within a predetermined amount of time (e.g., in a case where the number of valid feature points is less than a critical value), the omnidirectional image processing apparatus according to an exemplary embodiment of the present inventive concept may change the overlapping field of view of image capturing units and may thus allow an object whose feature points can be easily extracted to be included in each overlapping area.

Figure 7:
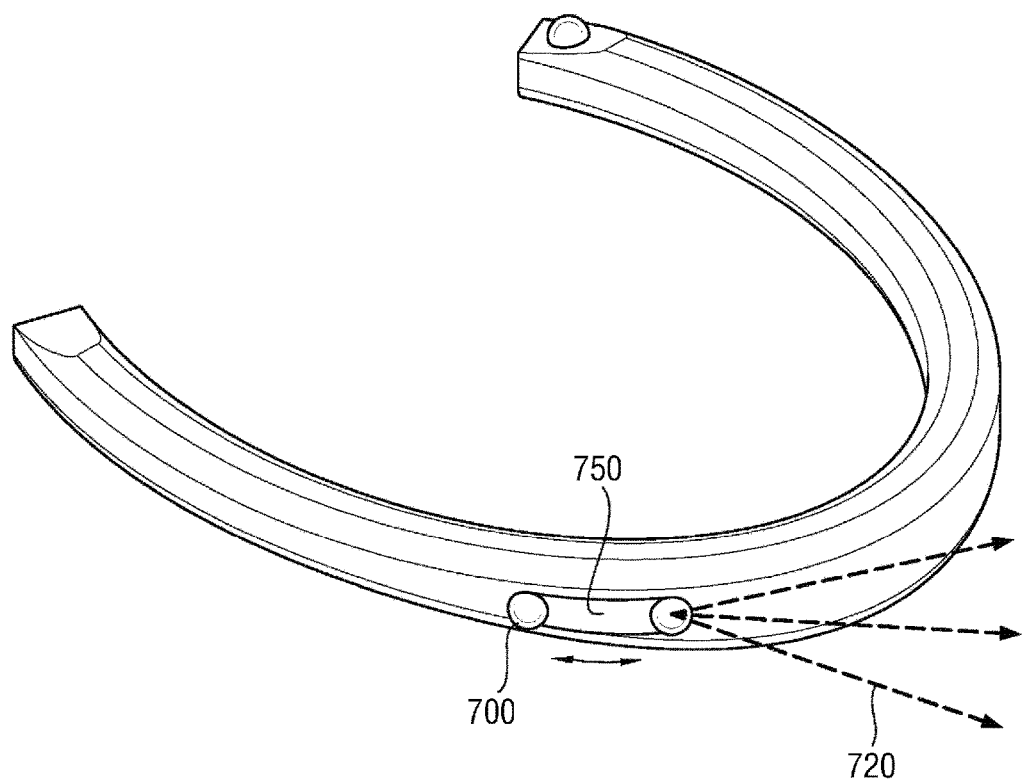
FIG. 7 is a schematic view illustrating an image capturing unit of an omnidirectional image processing apparatus according to an exemplary embodiment of the present inventive concept.

FIG. 7 is a schematic view illustrating an image capturing unit of an omnidirectional image processing apparatus according to an exemplary embodiment of the present inventive concept.

FIG. 7 illustrates an operation of an image capturing unit implemented in an omnidirectional image processing apparatus. The image capturing unit may be implemented at a particular location on the omnidirectional image processing apparatus, and the lens of the image capturing unit may be fixed so that an image capturing line thereof may be fixed. However, the image capturing unit may be movable over the omnidirectional image processing apparatus, and the direction faced by the lens in the image capturing unit (or the direction of the image capturing line) may change.

Referring to FIG. 7, the locations of a plurality of image capturing units in an omnidirectional image processing apparatus may change. For example, a structure 750 for moving an image capturing unit 700 may be implemented in the omnidirectional image processing apparatus. For example, the structure for moving the image capturing unit 700, such as a rail/groove, may be provided, and the image capturing unit 700 may be movable along the structure 750 for moving the image capturing unit.

For example, the omnidirectional image processing apparatus may change the location of the image capturing unit 700 to adjust each overlapping area. For example, for the convenience of image stitching, the location of the image capturing unit 700 may be changed, and each overlapping area may be adjusted.

Alternatively, the location of the image capturing unit 700 may be changed in consideration of the movement of a user. Due to the characteristics of the omnidirectional image processing apparatus as a wearable device, the omnidirectional image processing apparatus may perform image capturing for generating an omnidirectional image, while the user is moving. The location of the image capturing unit 700 may be changed in consideration of the characteristics of the movement of the user in order to correct heterogeneity between, or shake in, images that may be caused by the continuous movement of the user.

Also, for the adjustment of each overlapping area, the direction of an image capturing line 720 of a lens included in the image capturing unit 700 may be changed. For example, for the convenience of image stitching, the direction of the image capturing line 720 of the lens included in the image capturing unit 700 may be changed, and each overlapping area may be adjusted.

Also, the direction of the image capturing line 720 of the lens included in the image capturing unit 700 may be changed in consideration of the movement of the user. Due to the characteristics of the omnidirectional image processing apparatus as a wearable device, the omnidirectional image processing apparatus may generate an omnidirectional image, while the user is moving. The image capturing line 720 of the lens included in the image capturing unit 700 may be changed in consideration of the characteristics of the movement of the user in order to correct heterogeneity between, or shake in, images that may be caused by the continuous movement of the user.

Figure 8:
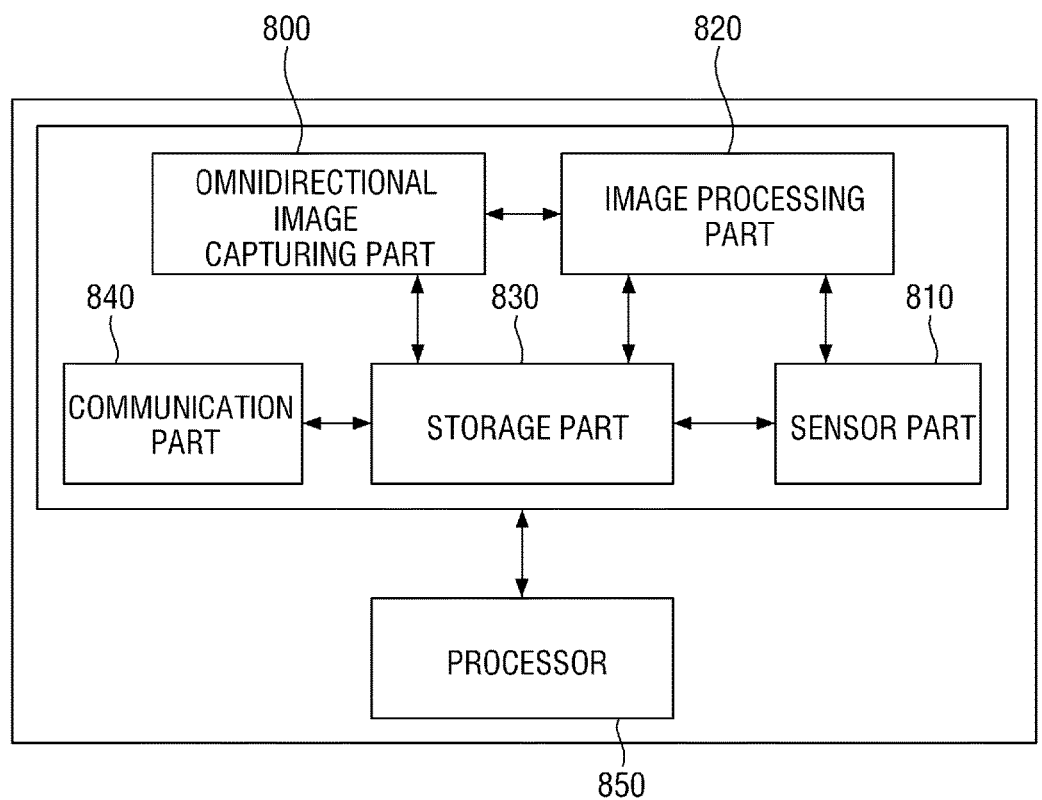
FIG. 8 is a block diagram of an omnidirectional image processing apparatus according to an exemplary embodiment of the present inventive concept.

FIG. 8 is a block diagram of an omnidirectional image processing apparatus according to an exemplary embodiment of the present inventive concept.

FIG. 8 illustrates the functional elements of the omnidirectional image processing apparatus when image processing is performed not in the omnidirectional image processing apparatus, but in a separate user device (e.g., a smartphone).

Referring to FIG. 8, an image processing system may include an omnidirectional image capturing part 800, a sensor part 810, an image processing part 820, a storage part 830, a communication part 840, and a processor 850.

The omnidirectional image capturing part 800 may be configured to capture an omnidirectional image. The omnidirectional image capturing part 800 may include a plurality of image capturing units for capturing an omnidirectional image. As already described above, the plurality of image capturing units may include first, second, and third image capturing units.

The sensor part 810 may be configured to sense motion information of a user. As a wearable device, the omnidirectional image processing apparatus may cause shake in each image depending on the movement of the user. The motion information of the user, sensed and generated by the sensor part 810, may be transmitted to a user device (e.g., a smartphone) for performing image processing and may thus be used for correcting any shake in each image.

Also, the sensor part 810 may be configured to sense a current image-capturing environment. For example, the sensor part 810 may sense information regarding the image-capturing environment (e.g., brightness (or luminance) or the like) of an image captured by each of the plurality of image capturing units. The result of the sensing may be transmitted to the user device (e.g., a smartphone) for performing image processing and may thus be used to correct differences in luminance between a plurality of images.

The current image-capturing environment may not be sensed by the sensing part 810. Instead, feature information of each image may be extracted by the user device for performing image processing, and differences in image properties (e.g., luminance) between a plurality of images may be corrected based on the feature information.

The image processing part 820 may be configured to process a plurality of images captured by the plurality of image capturing units. The image processing part 820 may collect the images captured by the plurality of image capturing units and may transmit them to the communication part 840.

The storage part 830 may be configured to store the images captured by the plurality of image capturing units.

The communication part 840 may be configured for communication between the omnidirectional image processing apparatus and an external device. For example, the communication part 840 the communication part 840 may be configured to transmit information regarding the images captured by the plurality of image capturing units and the sensing information generated by the sensing part 810 to the omnidirectional image processing apparatus and the user device (e.g., a smartphone or a virtual reality (VR) machine).

The processor 850 may be configured to control operations of the omnidirectional image capturing part 800, the sensor part 810, the image processing part 820, the storage part 830, and the communication part 840.

A driving part (not illustrated) may be configured for driving the plurality of image capturing units and/or lenses of the plurality of image capturing units.

In the example of FIG. 8, it is assumed that the omnidirectional image processing apparatus transmits the plurality of images captured by the plurality of image capturing units to the user device (e.g., a smartphone) and the user device generates an omnidirectional image by performing image processing (e.g., image stitching/correction) on the plurality of images. However, the omnidirectional image processing apparatus may generate an omnidirectional image through image processing.

Figure 9:
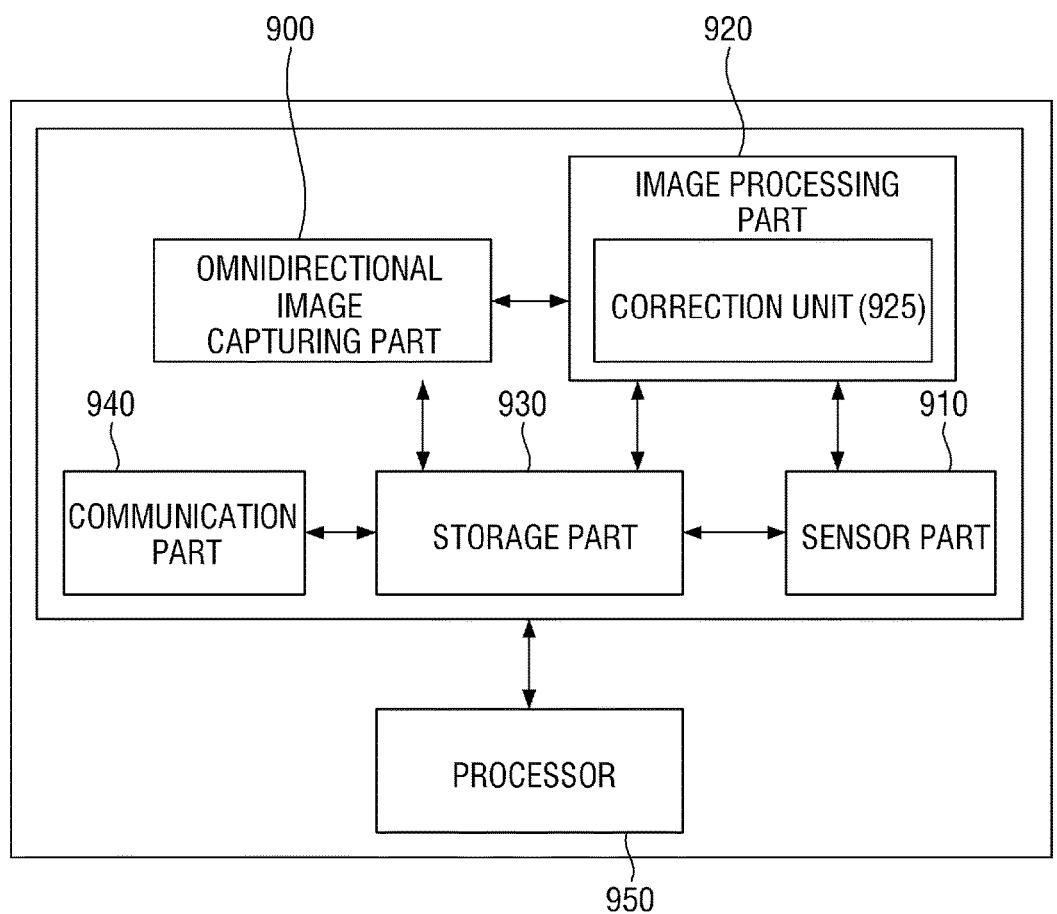
FIG. 9 is a block diagram of an omnidirectional image processing apparatus according to an exemplary embodiment of the present inventive concept.

FIG. 9 is a block diagram of an omnidirectional image processing apparatus according to an exemplary embodiment of the present inventive concept.

FIG. 9 illustrates the functional elements of the omnidirectional image processing apparatus.

Referring to FIG. 9, an image processing system may include an omnidirectional image capturing part 900, an image processing part 920, a correction part 925, a storage part 930, a communication part 940, and a processor 950.

The omnidirectional image capturing part 900 may be configured to capture an omnidirectional image. The omnidirectional image capturing part 900 may include a plurality of image capturing units for capturing an omnidirectional image. As already described above, the plurality of image capturing units may include first, second, and third image capturing units.

A sensor part 910 may be configured to sense motion information of a user and thus to generate motion information. As a wearable device, the omnidirectional image processing apparatus may cause shake in each image depending on the movement of the user. The image processing part 920 may correct shake in each image based on the motion information of the user, sensed and generated by the sensor part 910.

Also, the sensor part 910 may be configured to sense an image-capturing environment and thus to generate image-capturing environment information. The image-capturing environment of the plurality of image capturing units provided in the omnidirectional image processing apparatus may vary depending on the location of light (e.g., the sun). The sensor part 910 may sense information regarding the image-capturing environment (e.g., brightness (or luminance) or the like) of an image captured by each of the plurality of image capturing units. The result of the sensing may be used to correct differences in luminance between a plurality of images.

The image processing part 920 may be configured to process a plurality of images captured by the plurality of image capturing units and thus to generate an omnidirectional image. As already described above, the image processing part 920 may generate an omnidirectional image by extracting feature points from each overlapping area and matching the feature points to stitch together images.

The image processing part 920 may further include a correction unit 925. The omnidirectional image generated by the image processing part 920 may be an image corrected by the correction unit 925. The correction unit 925 may perform correction on an omnidirectional image. For example, the correction unit 925 may correct an image based on the sensed motion information of the user. Also, the correction unit 925 may correct the luminances of the plurality of images generated by the plurality of image capturing units. The stitching of images having different luminances may cause heterogeneity between the images. Thus, the correction unit 925 may generate an omnidirectional image with no heterogeneity by correcting the luminances of the plurality of images based on the luminance information of each of the plurality of images based on luminance information of each of the plurality of images. Also, the correction unit 925 may compensate the plurality of images for any movement/shake in consideration of the motion information of the user.

The storage part 930 may be configured to store images captured by the omnidirectional image capturing unit or an omnidirectional image generated by the image processing part.

The communication part 940 may be configured for communication between the omnidirectional image processing apparatus and an external device. For example, the communication part 940 may transmit an omnidirectional image to the omnidirectional image processing apparatus or a user device (e.g., a smartphone or a VR machine).

The processor 950 may be configured to control operations of the omnidirectional image capturing part 900, the image processing part 920, the correction unit 925, the storage part 930, and the communication part 940.

A driving part (not illustrated) may be configured to drive the plurality of image capturing units and/or lenses of the image capturing units.

FIG. 9 illustrates a method in which the omnidirectional image processing apparatus generates an omnidirectional image through image processing. However, alternatively, only some image processing steps may be performed in the omnidirectional image processing apparatus, and other image processing steps may be performed in a user device (e.g., a smartphone) connected to the omnidirectional image processing apparatus.

Figure 10:
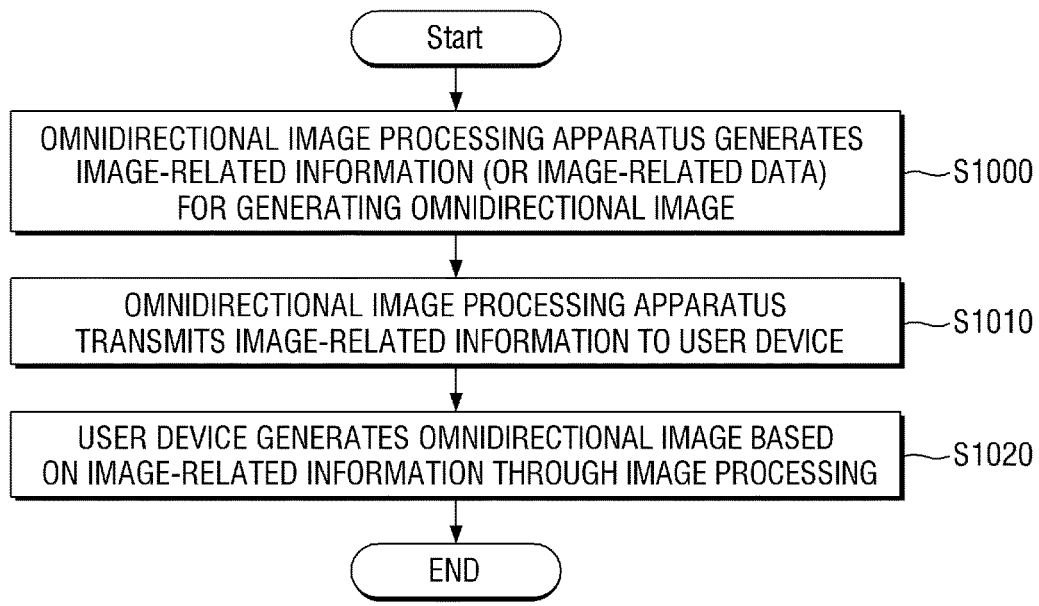
FIG. 10 is a schematic view illustrating an omnidirectional image processing apparatus according to an exemplary embodiment of the present inventive concept.

FIG. 10 is a schematic view illustrating an omnidirectional image processing method according to an exemplary embodiment of the present inventive concept.

Referring to FIG. 10, it is assumed that image processing (e.g., image stitching or correction) for forming an omnidirectional image is performed in a user device, but as already described above, image processing may be performed in an omnidirectional image processing apparatus and/or a user device connected to the omnidirectional image processing apparatus, and these exemplary embodiments all fall within the scope of the present inventive concept.

Referring to FIG. 10, image-related information (or image-related data) for generating an omnidirectional image is generated by an omnidirectional image processing apparatus (S1000).

For example, a plurality of image information may be generated by a plurality of image capturing units of the omnidirectional image processing apparatus. Also, user motion information/image-capturing environment information may be generated by a sensor part. The location of at least one of the plurality of image capturing units may be positioned relatively lower than the other image capturing units with respect to the ground.

A plurality of images may be generated by a plurality of image capturing lines of the plurality of image capturing units. The plurality of image capturing lines may be imaginary lines vertically penetrating the centers of a plurality of lenses included in the plurality of image capturing units, respectively. As already described above, the angle that at least one of the plurality of image capturing lines forms with the ground may differ from the angle that the other image capturing lines form with the ground.

At least one of the plurality of images may be in a first shape, and the other images may be in a second shape. An omnidirectional image may be generated by extracting feature points from each overlapping area formed by the first shape and the second shape and stitching together the first and second shapes.

The omnidirectional image processing apparatus transmits the image-related information to a user device (S1010).

The omnidirectional image processing apparatus may transmit the image-related information to the user device via a communication part.

The user device generates an omnidirectional image based on the image-related information through image processing (S1020).

The user device may perform image processing for generating an omnidirectional image based on the image-related information. Specifically, image stitching/correction may be performed on the plurality of images.

More specifically, the sensor part may include a three-dimensional (3D) accelerator and a 3D gyroscope. That is, the sensor part may include a 6-axis accelerator/gyroscope. Values for the distance from the 6-axis accelerator/gyroscope and the degree of misalignment with the 6-axis accelerator/gyroscope may be determined for the plurality of image capturing units, which are at fixed locations. For example, if the coordinates of a virtual origin are set to (0, 0), the 6 axis accelerometer/gyroscope and each individual image sensor may be set to particular pairs of coordinates. In response to the shake of the omnidirectional image processing apparatus, a calculation part may calculate the moving averages of the plurality of image capturing units relative to the coordinates of the virtual origin The moving averages may be calculated based on information relative to the virtual origin, extracted from the 6-axis accelerometer/gyroscope. The user device may perform image stabilization on the plurality of images based on the moving averages.

During image processing, the exposure/color values of the plurality of images captured by the plurality of image capturing units are acquired, and exposure/color value information of each of the images is fed back to the plurality of image capturing units such that the plurality of images can be corrected to have a similar range of exposure/color values. Also, the direction of a user's gaze upon a VR image may be calculated, and differences in color and exposure may be calculated by applying a weight to a part of the VR image that the user gazes at based on the result of the calculation. Color and exposure errors between input images may be variably corrected based on the plurality of images captured by the plurality of image capturing units. In a VR environment, unlike in a typical image environment where a part of an image that the user actually gazes at cannot be identified, the direction of the user's gaze can be identified. Thus, the level of importance in a spherical space may be calculated based on the user's gazing point, and an entire image may be corrected by weighting the level of importance during color/exposure correction for each image. In this manner, an omnidirectional image may be generated.

The above-described exemplary embodiments of the present inventive concept may be implemented in the form of a program command that can be performed through various computer components, and may be recorded on a computer-readable storage medium. The computer-readable storage medium may include a program command, a data file, and a data structure individually or a combination thereof. The program command recorded in the computer-readable storage medium may be specially designed and configured for the present inventive concept, or may be known to those skilled in a computer software field to be used. Examples of the computer-readable storage medium include a magnetic medium such as a hard disk, a floppy disk, and a magnetic tape, an optical medium such as a CD-ROM and a DVD, a magneto-optical medium such as a floptical disk, and a hardware device such as a ROM, a RAM, and a flash memory, that are specially configured to store and perform program commands. Examples of the program commands may include a machine code generated by a compiler and a high-level language code that can be executed in a computer using an interpreter. The hardware device may be configured as at least one software-module in order to perform the operations of the present inventive concept, and vice versa.

While the present inventive concept has been described with reference to specific details, such as detailed components, specific embodiments, and drawings, these are only examples to facilitate the overall understanding of the present inventive concept and the present inventive concept is not limited thereto. It will be understood by those skilled in the art that various modifications and changes can be made from the descriptions above.

Therefore, the spirit of the present inventive concept is defined not by the detailed description of the present inventive concept, but by the appended claims, and encompasses all modifications and equivalents that fall within the scope of the appended claims.

What is claimed is:

1. An omnidirectional image processing apparatus comprising:
    a plurality of image capturing units configured to generate a plurality of images for generating an omnidirectional image; and
    a processor configured to process the plurality of images,
    wherein the plurality of images are generated based on a plurality of image capturing lines of the plurality of image capturing units,
    the plurality of image capturing lines are imaginary lines vertically penetrating centers of a plurality of lenses included in the plurality of image capturing units, respectively,
    the omnidirectional image processing apparatus has a U shape that is open on one side,
    the plurality of image capturing units include a first image capturing unit, a second image capturing unit and a third image capturing unit,
    at least one among the first image capturing unit, the second image capturing unit and the third image capturing unit is located on the end portion of the U shape,
    the omnidirectional image processing apparatus includes an inner fixing structure being capable of being attached to and worn around a neck of the user,
    the inner fixing structure is connected to the omnidirectional image processing apparatus based on at least one connector,
    each of the plurality of image capturing lines is configured to adjust an overlapping area of each of a plurality of images captured by each of the plurality of image capturing units for stitching,
    an angle that at least one of the plurality of image capturing lines forms with an X-Z plane in an X-Y-Z coordinate space is different from an angle that the other image capturing lines form with the X-Z plane, and at least one of the plurality of image capturing units is positioned relatively lower than the other image capturing units with respect to a Y axis in the X-Y-Z coordinate space.

2. The omnidirectional image processing apparatus of claim 1, wherein the plurality of image capturing lines include a first image capturing line, a second image capturing line and a third image capturing line, the first image capturing unit captures an image based on the first image capturing line, the second image capturing unit captures an image based on the second image capturing line, the third image capturing unit captures an image based on the third image capturing line, and at least one field of view among a first field of view of the first image capturing unit, a second field of view of the second image capturing unit, a third field of view of the third image capturing unit is different.

3. The omnidirectional image processing apparatus of claim 1, wherein a shape of at least one image of the plurality of images is an inversely trapezoidal shape and a remaining image among the plurality of images is a trapezoidal shape, a first overlapping area, a second overlapping area, and a third overlapping area is generated based on an overlapping between the at least one image and a remaining image, each of a first overlapping area, a second overlapping area and a third overlapping area has different shape, and the omnidirectional image is generated based on stitching of the first overlapping area, the second overlapping area and the third overlapping area.

4. An omnidirectional image processing method comprising:

generating, by a plurality of image capturing units of an omnidirectional image processing apparatus, a plurality of images for generating an omnidirectional image; and generating an omnidirectional image by processing the plurality of images, wherein the plurality of images are generated based on a plurality of image capturing lines of the plurality of image capturing units, the plurality of image capturing lines are imaginary lines vertically penetrating centers of a plurality of lenses included in the plurality of image capturing units, respectively, the omnidirectional image processing apparatus has a U shape that is open on one side, the plurality of image capturing units include a first image capturing unit, a second image capturing unit and a third image capturing unit, at least one among the first image capturing unit, the second image capturing unit and the third image capturing unit is located on the end portion of the U shape, the omnidirectional image processing apparatus includes an inner fixing structure being capable of being attached to and worn around a neck of the user, the inner fixing structure is connected to the omnidirectional image processing apparatus based on at least one connector, each of the plurality of image capturing lines is configured to adjust an overlapping area of each of a plurality of images captured by each of the plurality of image capturing units for stitching, an angle that at least one of the plurality of image capturing lines forms with an X-Z plane in an X-Y-Z coordinate space is different from an angle that the other image capturing lines form with the X-Z plane, and at least one of the plurality of image capturing units is positioned relatively lower than the other image capturing units with respect to a Y axis in the X-Y-Z coordinate space.

5. The omnidirectional image processing method of claim 4, wherein the plurality of image capturing lines include a first image capturing line, a second image capturing line and a third image capturing line, the first image capturing unit captures an image based on the first image capturing line, the second image capturing unit captures an image based on the second image capturing line, the third image capturing unit captures an image based on the third image capturing line, and at least one field of view among a first field of view of the first image capturing unit, a second field of view of the second image capturing unit, a third field of view of the third image capturing unit is different.

6. The omnidirectional image processing method of claim 4, wherein a shape of at least one image of the plurality of images is an inversely trapezoidal shape and a remaining image among the plurality of images is a trapezoidal shape, a first overlapping area, a second overlapping area, and a third overlapping area is generated based on an overlapping between the at least one image and a remaining image, each of a first overlapping area, a second overlapping area and a third overlapping area has different shape, and the omnidirectional image is generated based on stitching of the first overlapping area, the second overlapping area and the third overlapping area.

7. A computer-readable recording medium having recorded thereon a computer program for executing the omnidirectional image processing method of any one of claims 4, 5 and 6.

* * * * *